(12) United States Patent
Thompson

(10) Patent No.: US 11,148,659 B2
(45) Date of Patent: Oct. 19, 2021

(54) STABILITY OF WORK MACHINES

(71) Applicant: Caterpillar SARL, Geneva (CH)

(72) Inventor: Stephen Thompson, Sunderland (GB)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 16/620,417

(22) PCT Filed: Jun. 6, 2018

(86) PCT No.: PCT/EP2018/064902
§ 371 (c)(1),
(2) Date: Dec. 6, 2019

(87) PCT Pub. No.: WO2018/224551
PCT Pub. Date: Dec. 13, 2018

(65) Prior Publication Data
US 2021/0094535 A1    Apr. 1, 2021

(30) Foreign Application Priority Data
Jun. 8, 2017 (GB) .................................... 1709135

(51) Int. Cl.
*B60W 30/02* (2012.01)
*G01C 21/00* (2006.01)
(Continued)

(52) U.S. Cl.
CPC ............ *B60W 30/04* (2013.01); *B60W 40/06* (2013.01); *B60W 40/1005* (2013.01); *G01C 21/005* (2013.01)

(58) Field of Classification Search
USPC ....................................................... 701/1, 50
See application file for complete search history.

(56) References Cited

U.S. PATENT DOCUMENTS 5,548,516 A * 8/1996 Gudat ..................... G01S 19/46
701/23
5,612,864 A * 3/1997 Henderson ............. E02F 3/847
356/3.01
(Continued)

FOREIGN PATENT DOCUMENTS

EP     2273334 A1 *  1/2011  .......... G05D 1/0274
EP     2273334 A1     1/2011
(Continued)

OTHER PUBLICATIONS

Search Report for related United Kingdom Application No. 1709135.6 reported on Dec. 6, 2017.
(Continued)

*Primary Examiner* — Jonathan L Sample

(57) ABSTRACT

The present disclosure relates to improvements in the stability of work machines. A method for predicting a risk of instability for one or more work machine(s) moving along a route along terrain of a worksite is provided. Ground condition data indicative of the ground condition of the terrain along the route is obtained. Surface topography data indicative of the surface topography of the terrain along the route is obtained. Route data indicative of the route along the terrain is generated. The ground condition data, the surface topography data and the route data are processed to generate risk data indicative of a risk of instability along the route.

20 Claims, 8 Drawing Sheets

(51) Int. Cl.
*B60W 30/04* (2006.01)
*B60W 40/06* (2012.01)
*B60W 40/10* (2012.01)

(56) References Cited

U.S. PATENT DOCUMENTS

| | | | | |
|---|---|---|---|---|
| 5,764,511 | A * | 6/1998 | Henderson | E02F 3/842 172/4.5 |
| 5,935,183 | A * | 8/1999 | Sahm | G01S 19/43 701/50 |
| 5,951,613 | A * | 9/1999 | Sahm | G01S 19/53 701/50 |
| 6,119,786 | A * | 9/2000 | Creger | A01B 63/1115 172/7 |
| 6,434,462 | B1 * | 8/2002 | Bevly | G01S 19/14 701/50 |
| 6,804,587 | B1 * | 10/2004 | O Connor | E02F 9/2045 342/357.31 |
| 6,865,465 | B2 * | 3/2005 | McClure | A01B 69/004 701/468 |
| 7,031,725 | B2 * | 4/2006 | Rorabaugh | G01S 5/0289 455/404.2 |
| 7,142,956 | B2 * | 11/2006 | Heiniger | G05D 1/027 701/23 |
| 7,383,114 | B1 * | 6/2008 | Lange | A01B 69/008 172/132 |
| 7,388,539 | B2 * | 6/2008 | Whitehead | G01S 19/44 342/357.36 |
| 7,460,942 | B2 * | 12/2008 | Mailer | G05D 1/0278 701/50 |
| 7,580,783 | B2 * | 8/2009 | Dix | G01C 21/005 342/357.36 |
| 7,689,354 | B2 * | 3/2010 | Heiniger | G05D 1/027 701/412 |
| 7,962,266 | B2 * | 6/2011 | Nelson | A01B 79/005 701/50 |
| 2003/0187577 | A1 * | 10/2003 | McClure | G01C 21/00 701/23 |
| 2003/0208311 | A1 * | 11/2003 | McClure | G01S 19/41 701/50 |
| 2004/0124605 | A1 * | 7/2004 | McClure | A01B 79/005 280/456.1 |
| 2004/0212533 | A1 * | 10/2004 | Whitehead | G01S 19/14 342/357.36 |
| 2005/0197756 | A1 * | 9/2005 | Taylor | E02F 3/847 701/50 |
| 2006/0042810 | A1 * | 3/2006 | Pecchio | E02F 3/764 172/781 |
| 2006/0142936 | A1 * | 6/2006 | Dix | G01C 21/005 701/50 |
| 2006/0282205 | A1 * | 12/2006 | Lange | G01C 21/20 701/50 |
| 2007/0021913 | A1 * | 1/2007 | Heiniger | A01B 69/008 701/412 |
| 2007/0088482 | A1 * | 4/2007 | Mailer | G05D 1/0278 701/50 |
| 2008/0004778 | A1 * | 1/2008 | Rekow | A01B 69/004 701/50 |
| 2008/0109141 | A1 * | 5/2008 | Nichols | E02F 3/842 701/50 |
| 2008/0147282 | A1 * | 6/2008 | Kormann | G01S 19/51 701/50 |
| 2010/0131122 | A1 * | 5/2010 | Dersjo | E02F 9/2045 701/2 |
| 2012/0173090 | A1 * | 7/2012 | Corcoran | G06Q 10/063 701/50 |

FOREIGN PATENT DOCUMENTS

WF WO 2016/195557 A1 12/2016
WO WO-2016195557 A1 * 12/2016 ............ B60W 30/04

OTHER PUBLICATIONS

International Search Report for related International Application No. PCT/EP2018/064902 reported on Aug. 31, 2018.

* cited by examiner

Grid 1

| Risk of Instability (R) Grid, where R= B x (1 – C) | | | | | | | | | | |
|---|---|---|---|---|---|---|---|---|---|---|
| | | Inclination (B) (degrees) | | | | | | | | |
| | | 2 | 4 | 6 | 8 | 10 | 12 | 14 | 16 | 18 | 20 |
| Compaction Coefficient (Cc) | 0.90 | 0.20 | 0.40 | 0.60 | 0.80 | 1.00 | 1.20 | 1.40 | 1.60 | 1.80 | 2.00 |
| | 0.83 | 0.33 | 0.67 | 1.00 | 1.33 | 1.67 | 2.00 | 2.33 | 2.67 | 3.00 | 3.33 |
| | 0.59 | 0.82 | 1.65 | 2.47 | 3.29 | 4.12 | 4.94 | 5.76 | 6.59 | 7.41 | 8.24 |
| | 0.40 | 1.20 | 2.40 | 3.60 | 4.80 | 6.00 | 7.20 | 8.40 | 9.60 | 10.80 | 12.00 |
| | 0.25 | 1.50 | 3.00 | 4.50 | 6.00 | 7.50 | 9.00 | 10.50 | 12.00 | 13.50 | 15.00 |
| | 0.20 | 1.60 | 3.20 | 4.80 | 6.40 | 8.00 | 9.60 | 11.20 | 12.80 | 14.40 | 16.00 |
| | 0.13 | 1.75 | 3.50 | 5.25 | 7.00 | 8.75 | 10.50 | 12.25 | 14.00 | 15.75 | 17.50 |
| | 0.10 | 1.80 | 3.60 | 5.40 | 7.20 | 9.00 | 10.80 | 12.60 | 14.40 | 16.20 | 18.00 |
| | 0.07 | 1.86 | 3.71 | 5.57 | 7.43 | 9.29 | 11.14 | 13.00 | 14.86 | 16.71 | 18.57 |
| | 0.05 | 1.90 | 3.80 | 5.70 | 7.60 | 9.50 | 11.40 | 13.30 | 15.20 | 17.10 | 19.00 |

*FIG. 7*

STABILITY OF WORK MACHINES

TECHNICAL FIELD

The present disclosure relates to improvements in the stability of work machines.

BACKGROUND

Work machines are commonly employed to carry out a plurality of different tasks on a worksite. Such work machines may include hauling machines, such as dump trucks, off-highway trucks, mining trucks, on-highway trucks or lorries, articulated haulers, and earth-moving machines, such as backhoes, loaders, dozers, shovels, wheeled tractor scrapers, motor graders and excavators. The work machines may be autonomously, semi-autonomously or manually operated to perform the tasks. The work machines may be articulated. Such articulated work machines comprise a first frame (such as a tractor unit) and a second frame (such as a trailer unit) connected to one another by means of an articulation joint. The articulation joint enables the frames to move relative to one another.

One problem which may occur with articulated work machines is if the tractor unit lifts off the ground, the articulation joint between the tractor unit and the trailer unit allows the tractor unit to rotate (roll) relative to the trailer unit. The result being that the tractor unit may roll onto its side (the ground) causing damage to the tractor unit. The trailer unit may also roll onto its side if the centre of gravity of the work machine changes, for example, when raising a dump body.

Work machines may be monitored by a monitoring system to predict the risk of rollover. WO2016/195557 describes one monitoring system for a work machine transporting a load. The system is configured to obtain ground topography data of a geographical area located close to the working machine and obtain weight information of the load currently being transported. A maximum allowed ground gradient for the machine is calculated based on the weight information. A risk of rollover is predicted if the working machine approaches a geographical area having a ground gradient exceeding the allowed gradient. The risk of rollover is calculated based upon the ground gradient along the driving path of the work machine. However, the methodology for determining the risk of rollover disclosed in WO2016/195557 has limited accuracy.

SUMMARY

The present disclosure provides a method for predicting a risk of instability for one or more work machine(s) moving along a route along terrain of a worksite. The method comprising obtaining ground condition data indicative of the ground condition of the terrain along the route; obtaining surface topography data indicative of the surface topography of the terrain along the route; generating route data indicative of the route along the terrain; and processing the ground condition data, the surface topography data and the route data to generate risk data indicative of a risk of instability along the route.

The present disclosure further provides a system for determining the risk of instability for a work machine moving along a route along a terrain of a worksite. The system comprising a navigation unit configured to generate route data indicative of the route along the terrain; one or more sensor(s) configured to generate ground condition data indicative of ground condition of the terrain of the worksite along the route; one or more sensor(s) configured to generate surface topography data indicative of surface topography of the terrain of the worksite along the route; and one or more processing unit(s) configured to process the ground condition data, the surface topography data and the route data to generate risk data indicative of a risk of instability along the route.

BRIEF DESCRIPTION OF DRAWINGS

The method and system of the present disclosure are described by way of example only in conjunction with the appended figures. It is emphasized that, in accordance with the standard practice in the industry, various features are not drawn to scale. In fact, the dimensions of the various features may be arbitrarily increased or reduced for clarity of discussion.

In the appended figures, similar components and/or features in different embodiments may have the same reference label. The description is applicable to any one of the similar components having the same reference label, unless otherwise indicated.

FIG. 7 illustrates a grid of exemplary data calculated according to the present disclosure.

DETAILED DESCRIPTION

Figure 1:
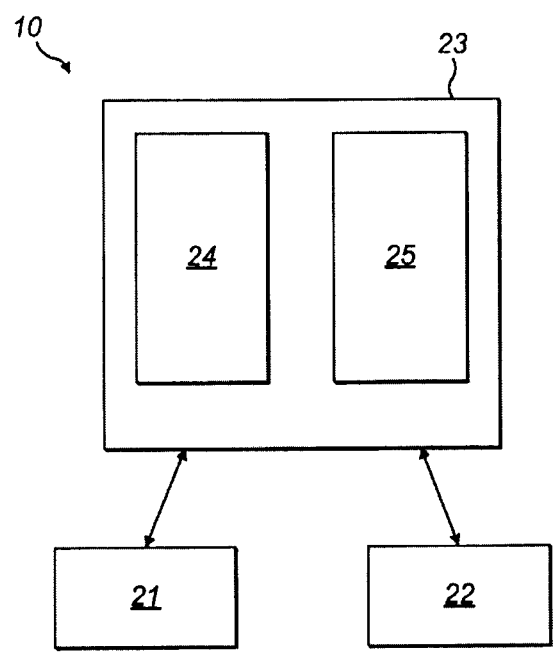
FIG. 1 illustrates an exemplary system of the present disclosure.

The ensuing description provides preferred exemplary embodiment(s) of the method and system of the present disclosure, and is not intended to limit the scope, applicability or configuration thereof. Rather, the ensuing description of the preferred exemplary embodiment(s) will provide those skilled in the art with an enabling description for implementing a preferred exemplary embodiment of the disclosure, it being understood that various changes may be made in the function and arrangement of elements, including combinations of features from different embodiments, without departing from the scope of the disclosure.

Specific details are given in the following description to provide a thorough understanding of the embodiments. However, it will be understood by one of ordinary skill in the art that embodiments may be practised without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally relates to a method and a system for determining the risk for a work machine moving along a route over a worksite to be unstable, hereafter referred to as a risk of instability. The risk of instability may refer to for example, the likelihood of a machine to roll or tip over from an upright, normal operating position onto its side, referred to hereafter as "rollover". The risk of instability may also refer to, for example, the likelihood of a machine to slide from its originally intended position due to the worksite having a slick surface, such as ice. One or more work machine(s) may move along a route and its position may be tracked. On-board sensor(s), or sensor(s) located in an independent surveying device or another work machine, may measure parameters indicative of the ground condition of the terrain along the route to generate ground condition data. The on-board sensor(s), or sensor(s) located in an independent surveying device may comprise instrumentation for measuring parameters indicative of the surface topography of the terrain along the route to generate surface topography data. The ground condition data and the surface topography data are processed to generate risk data indicative of a risk of instability of the work machine along the route. Therefore, the generated risk data is based upon the ground condition data and the surface topography data.

Figure 2:
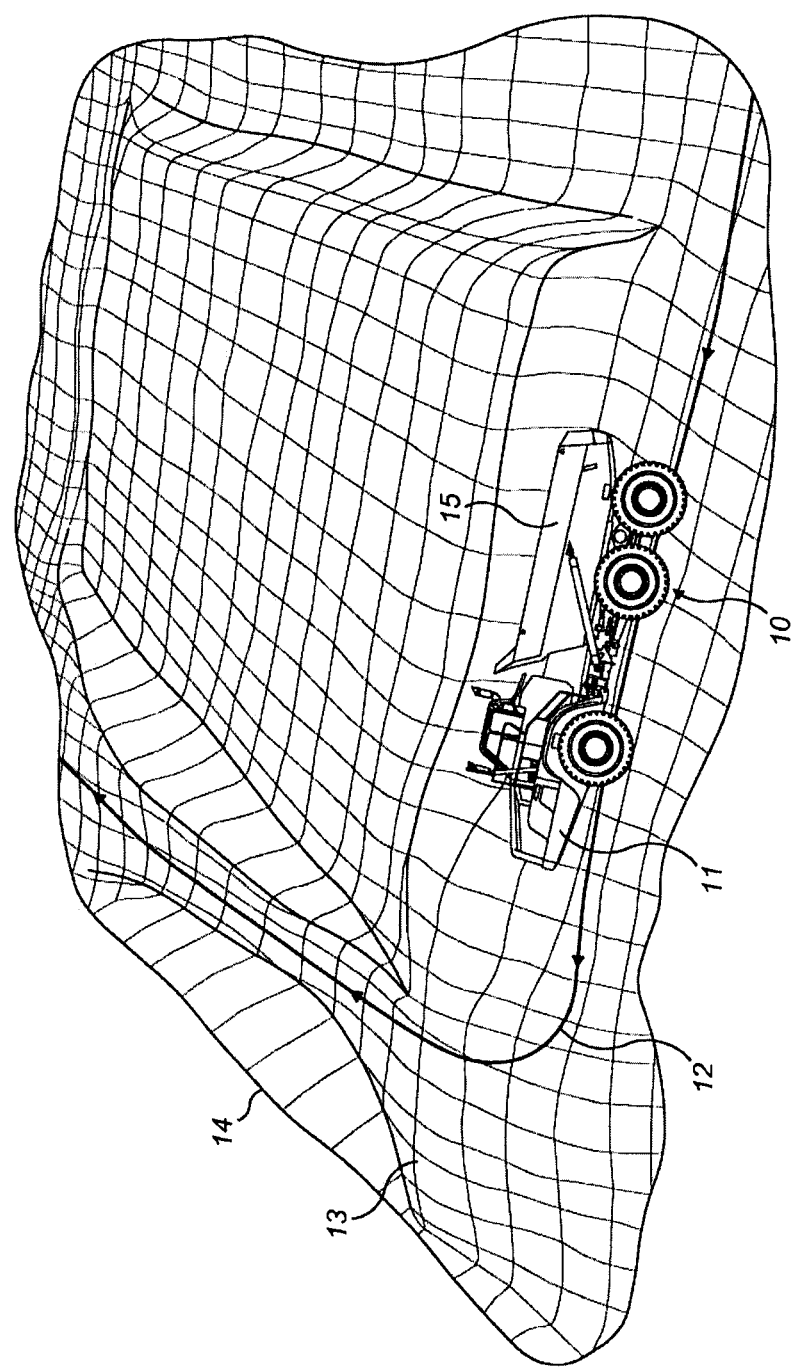
FIG. 2 illustrates the implementation of the system of FIG. 1 for a work machine.

FIG. 1 illustrates a system 10 configured to determine the risk of instability for a work machine 11 moving along a route 12 over the terrain 13 of a worksite 14. An example of such a work machine 11 is shown in FIG. 2.

The work machine 11 may be any type of work machine 11, particularly a hauling machine or material handling machine, suitable for the worksite 14. In accordance with the present disclosure, there may be a plurality of different work machines 11.

The illustrated work machine 11 is an articulated hauler, although the method and system of the present disclosure may be implemented with any other type of hauling machine, such as dump trucks, off-highway trucks, on-highway lorries, mining trucks, and articulated haulers, and/or material handling machine, such as backhoes, loaders, dozers, shovels, wheel tractor scrapers, drilling machines, motor graders, forestry machines and excavators. A hauling machine may be a work machine 11 configured predominantly for transporting bulk material. A material handling machine may be a work machine 11 configured to perform work on the terrain 13 of the worksite 14.

The work machine 11 may comprise an engine system configured to drive one or more ground engagement member(s) to move the work machine 11 along the route 12. The ground engagement member(s) may comprise one or more wheel(s), track(s) or the like. The engine system may comprise one or more power unit(s) (e.g. an internal combustion engine, electric motor and/or hydraulic motor) configured to drive a powertrain. The powertrain may comprise one or more transmission(s) configured to drive one or more output shaft(s) or the like for driving the ground engagement member(s).

The work machine 11 may comprise one or more work tool(s) 15 for performing work on the worksite 14. The form of the work tool(s) 15 may depend upon the type of the work machine 11. In the case of a hauling machine the work tool(s) 15 may comprise a dump body or other arrangement for holding bulk material during transportation. The dump body may be pivotable to allow ejection of the material or may comprise an actuatable ejector member within the dump body to enable ejection of the material. In the case of a material handling machine, the work tool(s) 15 may be of any suitable type for digging, lifting or otherwise manipulating material of the worksite 14, such as a bucket, shovel, conveyor or the like.

The work machine 11 may perform generally local work on a relatively small area of the terrain 13, such as digging or drilling, and may be differentiated from the work performed by a hauling machine, in which bulk material is transported over a relatively large distance. Although one or more compaction machines may be present on the worksite 14, the work machine 11 implementing the method and the system of the present disclosure may not be a compaction machine. A compaction machine may generally be considered to be a machine dedicated to compacting a terrain, such as a compactor, motorgrader, heavy soil compaction equipment and pneumatic, oil or vibratory rollers.

Figure 4:
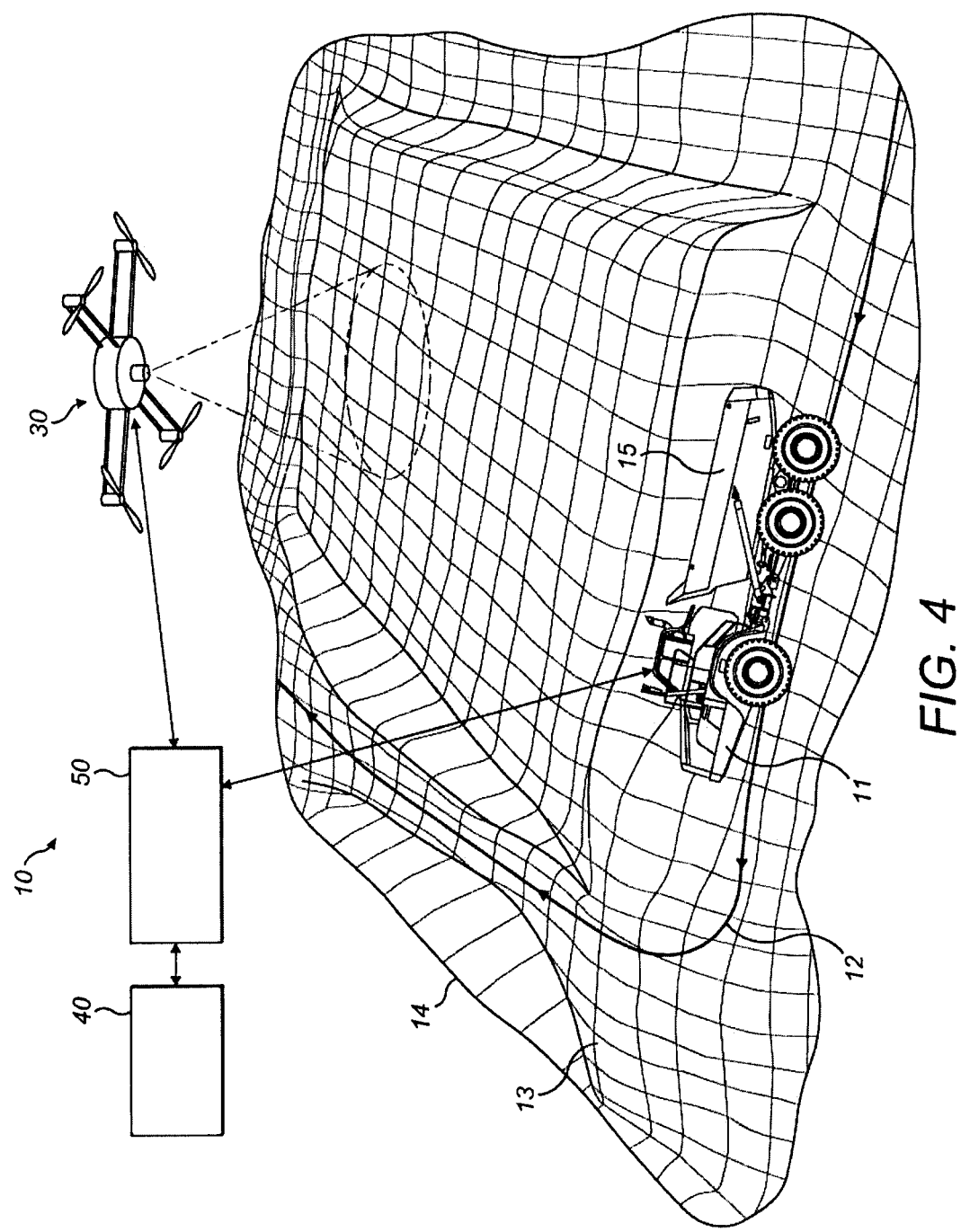
FIG. 4 illustrates the implementation of the system of FIG. 1 for a work machine and a surveying device.
Figure 5:
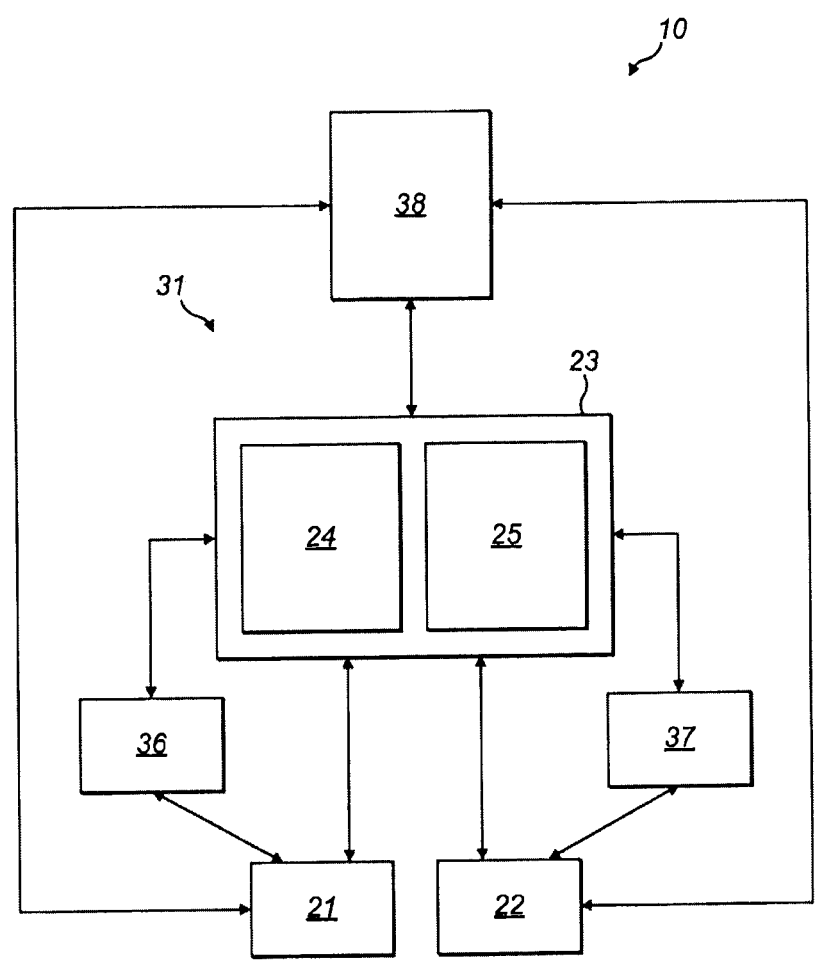
FIG. 5 illustrates an exemplary system of the present disclosure being employed within a surveying device.

The system 10 of FIG. 1 comprises one or more sensor(s) 21 configured to generate ground condition data and surface topography data. The ground condition data is indicative of ground condition of the terrain 13 along the route 12. The surface topography data is indicative of the surface topography or surface profile of the terrain 13 along the route 12. The sensor(s) 21 may be located on board the work machine 11, as depicted in FIG. 2, or within a surveying device, as depicted in FIGS. 4 and 5. The sensor(s) 21 may also be located in an external control system. The system 10 may comprise one or more navigation units 22 configured to generate route data indicative of the route 12 along the terrain 13. The navigation unit(s) 22 may be located on board a work machine 11, as depicted in FIG. 2, or within a surveying device 30, as depicted in FIGS. 4 and 5. The navigation unit(s) 22 may also be located in an external control system.

The system 10 may comprise one or more processing units 23 configured to process the ground condition data and the surface topography data to generate risk data indicative of the risk of instability of the work machine 11 moving along the route 12. The processing unit(s) 23 may also be configured to process the route data to associate the ground condition data and the surface topography data with the route data such that the ground condition data and the surface topography data are mapped to the route 12. The processing unit(s) 23 may be located on board the work machine 11, as depicted in FIG. 2, or within a surveying device 30 as depicted in FIGS. 4 and 5, or within an external control system.

The sensor(s) 21 may comprise any device configured to measure or otherwise determine and monitor ground condition of the area of the worksite proximal to the work machine and generate ground condition data. The sensor(s) 21 may be configured to determine and monitor one or more actual operating condition(s) of the work machine 11 whilst the work machine 11 is moving along the route. The sensor(s) 21 may also be configured to generate ground condition data based upon the actual operating condition(s). The operating condition may be any type of operating condition of the work machine 11, such as, for example, a machine speed, a direction of travel, an engine speed, a powertrain load, a braking or retarding load, gear selection or transmission ratio, positioning of the work tool 15, manipulation of the work tool 15 (e.g. opening or closing shears, a bucket and the like, which is part of the work machine 11), a payload measurement (e.g. the load caused by material in a dump body, bucket or the like), fluid pressure in hydraulic circuits (e.g. for controlling the work tool 15), electric current or voltage levels and the like. The one or more actual operating condition(s) may comprise one or more of the above operating conditions or operating conditions indicative of the state of the work machine 11 or a component, system or subsystem thereof. The sensor(s) 21 may utilise any method, sensor, instrumentation or other apparatus known in the art to obtain the ground condition data, such as photogrammetry, radar, LIDAR, laser scanners, video systems, audio systems or a combination thereof. In particular the sensor(s) 21 may comprise a measuring device, such as a ground penetration radar device configured to generate ground condition data by detecting compaction of the terrain 13 and voids, cracks and other subsurface objects with the terrain 13.

The sensor(s) 21 may comprise a strain sensor for determining the stress and/or strain on a machine structure (e.g. the stresses experienced by a beam of a suspension system), a load sensor for determining the load upon a machine structure (e.g. a sensor(s) 21 positioned to determine the payload in a dump body), an internal temperature sensor for determining the temperature of a machine structure (e.g. the temperature of hydraulic fluid or brakes), an external temperature sensor for determining the ambient temperature for the machine, a speed sensor for determining the speed/velocity of a machine structure (e.g. an engine output speed sensor for detecting the rotational velocity of an output shaft from the engine), a position sensor for determining the position of a machine structure (e.g. the position of parts of the work tool 15), an accelerometer for measuring the acceleration experienced by the machine structure and/or the work machine 11 due to vibrations and/or a load, and the like. In particular, one or more accelerometer(s) may be arranged to measure the load input to one or more ground engaging members (e.g. wheels or tracks).

The sensor(s) 21 may also comprise any device configured to measure or otherwise determine and monitor the two-dimensional or three-dimensional surface profile or surface topography of the terrain 13 and generate surface topography data. The surface topography data may comprise inclination data. The sensor(s) 21 may comprise a device such an as inclination sensor configured to measure the inclination of the work machine(s) 11 on the terrain 13 and generate the inclination data. The measured inclination may be the inclination of the work machine(s) 11 on the terrain 13 relative to the direction of gravity in two or three dimensions (e.g. front to back and/or side-to-side inclination). The sensor(s) 21 may utilise any method, sensor, instrumentation or other apparatus known in the art to obtain the actual surface topography data, such as photogrammetry, radar, LIDAR, laser scanners, video systems, audio systems or a combination thereof.

If the work machine 11 comprises a dump body or other arrangement for holding bulk material during transportation, then the sensor(s) 21 may further comprise a dump body monitor to determine the status of a dump body of the work machine 11. In particular, the dump body monitor may comprise an inclination sensor for measuring the inclination of a pivotable dump body, a position sensor for determining the position of an ejector member of a dump body with an ejector and/or a load sensor for determining the load of material, if any, in the dump body.

The navigation unit(s) 22 may determine the position of the work machine 11 and generating actual machine position data indicative of its position on the worksite 14. The navigation unit(s) 22 may determine the location of the work machine 11 on the Earth's surface and/or may determine the location of the work machine 11 relative to a reference position on the worksite 14. The actual position data may comprise the position of the work machine 11 in two dimensional coordinates X, Y representing its position on a plane parallel to the surface of the worksite 14/surveying device. The actual machine position data may also comprise a third dimensional coordinate Z indicative of the "height" of the machine relative to a reference height. The actual position data may comprise a plurality of coordinates indicating the position of the work machine 11 as it moves over the terrain 13 and the plurality of coordinates may define the route 12. The plurality of coordinates may be generated by sampling the position of the work machine 11 at time intervals. The navigation unit(s) 22 may comprise a position sensor(s) operable to determine the position of the work machine 11 via a global navigation satellite system, such as global positioning system (GPS), or via triangulation with communication masts. Alternatively, the navigation unit(s) 22 may substantially continuously monitor at least the speed and direction of the work machine 11 as it moves over the worksite 14 between a first and second location. The coordinates of the first location may be stored in a memory within the navigation unit(s) 22. Based upon the monitored speed and direction of the work machine 11, the navigation unit(s) 12 may be operable to determine the coordinates of the second location.

The processing unit(s) 23 may be configured to receive data from the navigation unit(s) 22 and/or the sensor(s) 21. The processing unit(s) 23 may be communicatively connected (via a wired or wireless connection) to the navigation unit(s) 22 and/or the sensor(s) 21. Whilst the processing unit(s) 23, sensor(s) 21 and navigation unit(s) 22 are described as separate features, these features may instead form a single unit.

The processing unit(s) 23 may comprise a memory 24, which may store instructions or algorithms in the form of data, and a processor 25, which may be configured to perform operations based upon the instructions. The memory 24 may comprise any suitable computer-accessible or non-transitory storage medium for storing computer program instructions, such as RAM, SDRAM, DDR SDRAM, RDRAM, SRAM, ROM, magnetic media, optical media and the like. The memory 24 may store a computer program for generating risk data indicative of a risk of instability of the work machine along the route. The processor 25 may be capable of executing memory-stored instructions, such as a microprocessor, uniprocessor, a multiprocessor and the like. The processing unit(s) 23 may further comprise a graphics processor (not shown) for rendering objects for viewing on a display.

FIG. 2 depicts an embodiment of the present disclosure being implemented for a work machine 11 moving along the route 12 over the terrain 13 of the worksite 14. In this embodiment, the sensor(s) 21, the navigation unit(s) 22 and the processing unit(s) 23 are located on board the work machine.

The worksite 14 may comprise an area in which earth or other material is moved and/or manipulated and may be an off-road area. The illustrated worksite 14 is a mine, although in other embodiments the worksite 14 may comprise a construction site, mine, quarry, waste dump site, aggregate site or the like. The terrain 13 may comprise the ground of the worksite 14 over which the work machine 11 travels.

The route 12 along the worksite may comprise the path of the work machine 11 over the terrain 13. The route 12 may comprise a path from a first location to a second location.

If the work machine 11 is a hauling machine the first location may be a location on the worksite 14 at which the hauling machine is loaded with material and the second location may be a location on the worksite 14 at which the hauling machine ejects the material. The route 12 may therefore be a "haul route" and the work machine 11 may travel over the haul route a plurality of times in order to transfer a plurality of loads of material between the first and second locations. If the work machine 11 is a material handling machine the first location may be the location at which the work machine 11 picks up material from the terrain 13 and the second location may be the location at which the work machine 11 deposits the material into a hauling machine. A haul route may be a route 12 between a loading location and an ejection location. The work machine 11 may be a hauling machine and travel along the haul route, for example between a first location, at which the material handling may be parked or stored when not in use, and a second location, where the material handling machine may perform work.

Figure 3:
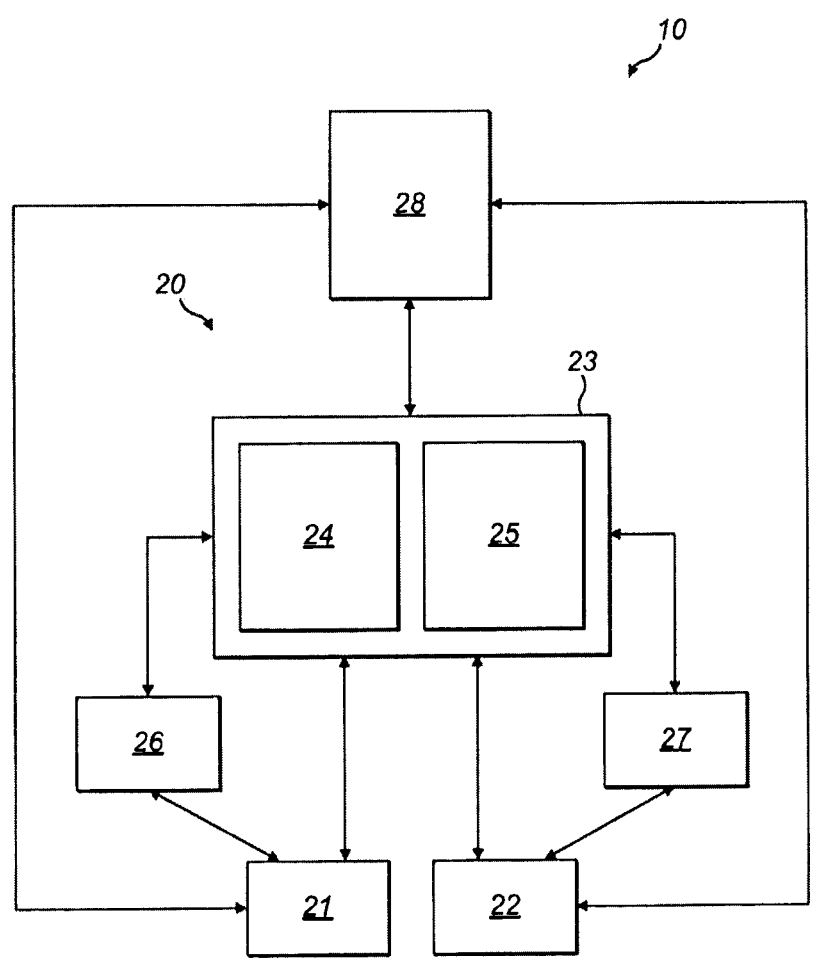
FIG. 3 illustrates an exemplary system of the present disclosure being employed within a work machine control system.

The work machine 11 may comprise a machine control system 20 as schematically illustrated in FIG. 3. The machine control system may comprise the sensor(s) 21, the navigation unit(s) 22 and/or the processing unit(s) 23 described above and so may be configured to perform the method of the present disclosure. The previous description of the sensor(s) 21, the navigation unit(s) 22 and the processing unit(s) 23 equally applies to this embodiment. The machine control system may further comprise one or more machine input(s) 26, one or more machine output(s) 27 and/or a machine communication module 28. The machine communication module 28 will be described subsequently in further detail. The input(s) 26 may comprise a device for operation by, or receiving one or more input signal(s) from, an operator for controlling the work machine 11, such as a gear selector, a steering wheel, a brake pedal, a speed selector (e.g. an accelerator pedal), a work tool 15 manipulator (e.g. a joystick), a dashboard button and the like. The input(s) 26 may relate to one or more operating condition(s) of the work machine 11, such as a gear selection, movement of the steering wheel, a braking command, a speed command, a work tool 15 manipulation, a button press or the like.

The output(s) 27 may comprise a device for operating the work machine 11 in accordance with the one or more operating condition(s) discussed above. Exemplary output(s) 27 include the transmission, the engine or any part thereof, a valve system, a fuel injection system, an electric, pneumatic and/or hydraulic system for controlling the work machine 11 and/or one or more work tool(s) 15 (particularly a dump body, ejector body or conveyor), a steering mechanism, brake actuators, a differential lock, a display for displaying information to an operator, lights and the like. The operating condition(s) implemented by the output(s) 27 may be any type of operating condition of the work machine 11, such as, for example, a machine speed, a direction of travel, an engine speed, a powertrain load, a braking or retarding load, gear selection or transmission ratio, work tool 15 positioning, work tool 15 manipulation (e.g. opening or closing shears, as bucket and the like), a payload measurement (e.g. the load caused by material in a dump body, bucket or the like), fluid pressure in hydraulic circuits (e.g. for controlling the work tool 15), electric current or voltage levels and the like.

As discussed above, the sensor(s) may comprise any device configured to determine and monitor one or more actual operating condition of the work machine 11 and generate ground condition data based upon the actual operating condition(s). In this embodiment, the sensor(s) 21 may be configured to sense operation of the input(s) 26 or the effect of the operation of the output(s) 27.

The processing unit(s) 23 may be communicatively connected (via a wired or wireless connection) to one or more of the machine input(s) 26, the machine output(s) 22, the one or more sensor(s) 21, the navigation unit(s) (22), and/or the machine communication module 28.

As shown in FIGS. 4 and 5, according to the present disclosure, the system 10 may further comprise one or more surveying device(s) 30. The surveying device(s) 30 may be a device separate from the work machine 11, as illustrated. The surveying device(s) 30 may comprise an aerial platform, such as a manned aircraft or unmanned aerial vehicle ("UAV"), or a terrestrial (i.e. land based) platform (manned or unmanned). Alternatively, the surveying device(s) 30 may be partly or entirely embodied in the work machine 11. The one or more sensor(s) 21 and/or navigation unit(s) 22 and/or processing unit(s) 23 described above may be located within the surveying device(s) 30, instead of, or in addition to one or more sensor(s) 21 located on the work machine 11. Therefore, in this embodiment, the sensor(s) are configured to measure the ground condition and surface topography of the area of the worksite proximal to the surveying device(s) 30 and generate the ground condition and surface topography data. In particular, one of the sensors 21 of the surveying device(s) 30 may be a scanning device that uses LIDAR (Light (lazar) Imaging Detection, And Ranging) to measure surface topography of the worksite 14. Another sensor 21 of the surveying device(s) 30 may use ground penetrating radar to measure compaction of the worksite 14. The sensor(s) 21 of the surveying device may therefore generate compaction and surface topography data. The navigation unit(s) 22 may be configured to measure the position of the surveying device and generate the route data. The surveying device 30 may comprise a surveying control system 31. The sensor(s) 21 and/or the navigation unit(s) 22 and/or the processing unit(s) 23 may be located in the surveying control system 31. The previous and subsequent description of the sensor(s) 21, navigation unit(s) 22 and processing unit(s) 23 in relation to the work machine 11 equally apply to the surveying device 30.

The surveying control system 31 may further comprise one or more surveying input(s) 36, one or more surveying output(s) 37 and/or a surveying communication module 38. The surveying communication module 38 will be described subsequently in further detail.

The surveying input(s) 36 may comprise a device for operation by, or receiving one or more input signal(s) from, an operator for controlling the surveying device 30, such as a gear selector, a steering system, a brake pedal, a speed selector (e.g. an accelerator pedal) and the like. The surveying input 36 may relate to one or more operating condition(s) of the work machine 11, such as a gear selection, a steering command, a braking command, a speed command, a button press or the like.

The surveying output(s) 37 may comprise a device for operating the surveying device 30 in accordance with the one or more operating condition(s) discussed above. Exemplary surveying output(s) 37 include the transmission, the engine or any part thereof, a valve system, a fuel injection system, an electric, pneumatic and/or hydraulic system for controlling the surveying device, a steering mechanism, brake actuators, a differential lock, a display for displaying information to an operator, lights and the like. The operating condition(s) implemented by the surveying output(s) 37 may be any type of operating condition of the surveying device 30, such as, for example, a machine speed, a direction of travel, an engine speed, gear selection or transmission ratio, electric current or voltage levels and the like.

The processing unit(s) 23 may be communicatively connected (via a wired or wireless connection) to one or more of the surveying input(s) 36, the surveying output(s) 37, the sensor(s) 21, the navigation unit(s) 22 and/or the surveying communication module 38.

The processing unit(s) 23 may be configured to receive data from one or more of the surveying input(s) 36, the sensor(s) 21, the navigation unit(s) 22, and/or the surveying communication module 38. The processing unit(s) 23 may be configured to perform operations based upon the received data, such as by sending data to the surveying output(s) 37, the surveying communication module 38 and/or performing calculations or carrying out logic-based tasks. In particular, the processing unit(s) may process the received data to generate the risk data. The processing unit(s) may then perform further operations based upon the risk data.

As illustrated in FIG. 4, the system 10 of the present disclosure may further comprise an external control system 40 and/or a communication system 50 (i.e. external to the machine control system 20).

The communication system 50, associated machine and surveying communication modules 28, 38 and the external control system 40 may comprise any type suitable apparatus for communication and transfer of data therebetween, particularly a wireless or wired network. Exemplary wireless networks include a satellite communication network, broadband communication network, cellular, Bluetooth, microwave, point-to-point wireless, point-to-multipoint wireless, multipoint-to-multipoint wireless, Wireless Local Service (WiFi Dongle), Dedicated Short-Range Communications (DSRC) or any other wireless communication network. Exemplary wired networks include Ethernet, fibre optic, waveguide or any other suitable wired connection. The communication system 50 may be configured to enable communication and transfer of data between the work machine 11 and another work machine 11, between the surveying device 30 and another surveying device 30, between the work machine 11 and the surveying device 30, between the work machine 11 and the external control system 40, between the surveying device 30 and the external control system 40.

As discussed above, the work machine 11 may comprise the surveying device(s) 30, which may form part of the machine control system 20. Therefore, the system 10 may not comprise the communication system 50 or the communication system 50 may be embodied as connections between the aforementioned components of the machine control system 20.

The external control system 40 may be a computer system and may comprise any known computer system, such as a personal computer, laptop, tablet computer, server, smartphone and the like. The external control system 40 may be separate from the work machine 11. The external control system 40 may be located in a monitoring station on the worksite 14 or at a station remote to the worksite 14. For example, the external control system 40 may be located in a central server and database of the operating company of the worksite 14 and/or the work machine 11. Alternatively, the external control system 40 may be located on the work machine 11, but be substantially separate from the machine control system 20.

As discussed above, the sensor(s) and/or navigation unit(s) of the system may be located in the work machine 11 such as a handling machine or a compaction machine or in a surveying device 30 or in the external control system 40. The processing unit(s) 23 may be located in the work machine 11, and/or in the surveying device 30, and/or in the external control system 40. The data collected by the sensor(s) 21 may be transferred via the communication system 50 to the processing unit(s) 23 located in the same or in a different device. Therefore, the method of the present disclosure may be performed by the work machine 11 such as the handling machine or the compaction machine, the surveying device 30 or the external control system 40. Consequently, any description of the operation of the system 10 in the present disclosure with reference to the machine control system 20 may be considered to equally apply to the external control system 40 or the surveying device 30 performing the method.

INDUSTRIAL APPLICATION

Figure 6:
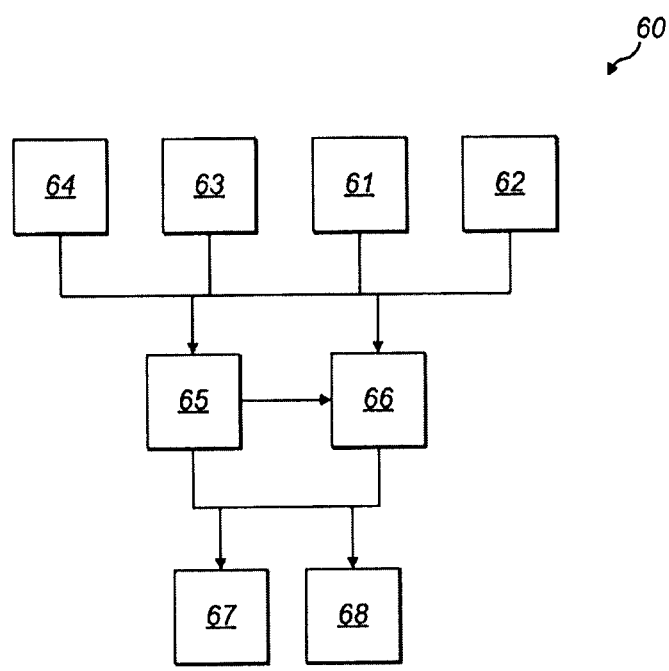
FIG. 6 is a flow diagram of the method of operating the system of the present disclosure.

An exemplary method 60 of operating the system 10 of the present disclosure is schematically illustrated in FIG. 6. Whilst the method 60 is described in relation to the control module of the work machine 11 and the external control system 40, it may equally be employed in the control system 31 of the surveying device 30. The method may comprise a machine operation step 61, a route determination step 62, a ground condition data generation step 63, a surface topography data generation step 64, a risk data generation step 65, a mapping step 66, a communication step 67 and/or a machine control step 68.

During the machine operation step 61 the one or more work machine(s) 11 may be operated to travel along the route 12. The work machine(s) 11 may be operated by a human operator (i.e. manually), semi-autonomously or autonomously. The work machine(s) 11 may be operated in accordance with one or more operating parameter(s), which may be one of:
- a power unit output torque, which may be the output torque of the power unit of the work machine 11;
- a machine speed, which may be the speed of the work machine 11 moving along the route 12;
- a machine direction, which may be the direction of travel of the work machine 11 as it moves along the route 12;
- a machine inclination, which may be the inclination of the work machine 11 on the terrain 13 relative to the direction of gravity in two or three dimensions (e.g. front to back and/or side-to-side inclination);
- a machine position, which may be the position of the work machine 11 at a point in time as it moves along the route 12;
- a work tool position, which may be the position and/or orientation of the work tool 15, for example a dump body, relative to the direction of gravity and/or the work machine 11;
- an engine rotating speed, which may be the rotational velocity of the output shaft of the engine of the work machine 11; and/or
- a machine payload, which may be the load or weight of the work machine 11 and any material being transported by the work machine 11, such as in a dump body or the like.

During the route determination step 62, the system 10 may determine route data indicative of the route 12 of the work machine(s) 11 during the machine operation step 61. The machine position data from the navigation unit may be utilised to create route data representing a map, in two or three dimensions, of the route 12. Alternatively, the total distance of the route 12 may be determined, such as by utilising machine speed data and the time taken to travel the route 12.

In the ground condition data generating step 63, actual and/or simulated ground condition data may be generated. The step of generating ground condition data may comprise monitoring the operating parameter(s) as the work machine(s) 11 is operated in accordance with the machine operation step 61. The ground condition data may be generated by the external control system 40 or the machine control system 20. In particular, the sensor(s) 21 may monitor the operating parameter(s) as the work machine 11 is operated in accordance with the machine operation step 61. The sensor(s) 21 may receive operating parameter data from the input(s) 26 and navigation unit(s) 22. Alternatively, the processing unit(s) 23 may receive the operating parameter data from the input(s) 26, the sensor(s) 21 and the navigation unit(s) 22. The operating parameter data may be indicative of one of the machine speed, direction, inclination, position and payload. The operating parameter data indicative of the operating parameter(s) may be received continuously or may be sampled at time periods. The sensor(s) 21 or the processing unit(s) 23 may process the operating parameter data obtained to generate ground condition data.

The ground condition data may comprise rolling resistance data indicative of the resistance by the terrain to the movement of the work machine 11 along the route. The external or machine control system 40, 20 may process the operating parameter data to determine the rolling resistance of the work machine(s) 11. In particular, the operating parameter data may be processed by the sensor(s) 21 or the processing unit(s) 23. The rolling resistance may be calculated a plurality of times along a plurality of positions of the route 12 or continuously in order to generate rolling resistance data. The rolling resistance data may be unitless. The method 60 of the present disclosure may therefore be directed to determining the variation of the rolling resistance rather than and actual rolling resistance value. A coefficient of rolling resistance Crr may be calculated based upon the driving force Fdrive of the work machine(s) 11 and accounting for losses during the movement of the work machine(s) 11. The losses may include the aerodynamic drag Fdrag on the work machine(s) 11 and an inclination force Fgrade acting on the work machine(s) 11. Inertial losses Facc during any acceleration of the work machine(s) 11 may also be accounted for. Crr may be determined via the equation:

$$Crr=(Fdrive-Fgrade-Fdrag-Facc)/(m \times g)$$

Crr may be converted into a percentage RR; m is the machine payload, which may include the weight of the work machine(s) 11 and any material thereon; g is the gravity of Earth; Fgrade may be calculated based upon the inclination angle a of the terrain 13, which may be determined from the inclination sensor(s) 21, and utilising the equation:

$$Fgrade = m \times g \times \sin(a)$$

By way of example, sin(a), and so Fgrade would be equal to 0 for any side-to-side inclination of the work machine(s) 11. The inclination angle may be a composite angle indicative of both side-to-side inclination and back-to-front inclination of the work machine(s) 11 on the terrain 13.

Fdrag may be estimated based upon the machine speed and a known frontal area of the work machine(s) 11. A memory of the sensor(s) 21 (not illustrated) or the memory 24 of the processing unit(s) 23 may store data relating to the frontal area of the work machine(s) 11 for retrieval by the external or machine control system 40, 20 for use in the calculation. Facc may be estimated based upon the acceleration of the work machine(s) 11 or the measured machine speed, which may be determined from an accelerometer thereon, and/or m.

Fdrive may be an estimation or calculation of the force applied by the work machine(s) 11 where the ground engaging member(s) contacts the terrain 13 in order to move the work machine(s) 11. Fdrive may be the rimpull force in the case of the ground engaging member(s) comprising a wheel or the drawbar force in the case of the ground engaging member(s) comprising tracks. The method of calculating or estimating Fdrive is well known in the art and, for example, may be determined from lookup tables stored on the memory 24 based upon operating parameter data. Alternative, Fdrive may be determined based upon an estimated driving torque driving the ground engaging member(s) and the known radius of the ground engaging member(s). The estimated driving torque may be determined based upon an estimated engine output torque and a known transmission ratio across the powertrain. The estimated engine output torque may be determined using any method known in the art, particularly using the engine rotating speed. The engine output torque may also be estimated utilising the fuel rate and/or volume commanded for injection into the engine and a known fuel to engine output torque ratio.

The ground condition data may further comprise compaction data indicative of the compaction of the terrain 13 along the route 12. The step of generating the ground condition data may further comprise converting the rolling resistance data to compaction data indicative of the compaction of the terrain 13 along the route 12. In the present disclosure "compaction" may refer to the density or looseness of the material, such as soil, forming the terrain 13. A high compaction may indicate a high density and thus may indicate that the terrain 13 is relatively high hardness or low softness. A low compaction may indicate a low density and thus may indicate that the terrain 13 is a relatively low hardness or high softness. A relatively high compaction may improve the load bearing capacity of the terrain 13 such that there is less resistance to the work machine(s) 11 travelling over the terrain 13. The rolling resistance is inversely proportional to the level of compaction. In the present disclosure the rolling resistance data may be converted to compaction data by inverting the compaction data. In particular, a compaction coefficient $Cc=1/Crr$ and a compaction percentage $CC=100-RR$.

The rolling resistance data and/or compaction data may also be utilised in a soil elastic modulus (i.e. Young's modulus) calculation, which may also be based upon the depth of penetration of the ground engaging member(s) into the terrain 13. The soil elastic modulus calculation may be used to generate soil elastic modulus data.

The generating ground condition data step 63 may comprise generating simulated ground condition data and/or retrieving previously generated simulated or actual ground condition data from a memory, such as the memory of the external control system 40 or the machine control system 20. The simulated ground condition data may be randomly generated, operator generated (e.g. explicitly specified by an operator) or may be based upon actual ground condition data from a historical worksite 14. The memory may store simulated ground condition data from a plurality of worksites 14.

The generating ground condition data step 63 may instead comprise measuring compaction of the ground of the terrain 13 and generating compaction data using a measuring device of the sensor(s) 21. Here, there is no requirement to generate rolling resistance data or to measure operating parameters of the work machine 11 to generate ground condition data. The measuring device may be, for example, a ground penetration radar device, a standard radar device, a camera system. To generate ground condition data, for example, compaction data, the measuring device may measure the depth of penetration of the work machine 11 into the terrain 13. The measuring device may measure the actual distance from the measuring device to the area of the terrain 13 on which the work machine 11 is located. This distance may be compared to an expected distance from the measuring device to the terrain 13 to generate the ground condition data. The expected distance may be the expected distance between the measuring device and the terrain 13 for a terrain 13 having firm ground. The expected distance may be a pre-determined value and may also be calculated using simulations. The ground condition data generated using the measuring device, such as the ground penetration radar device, may be compared to or combined with the ground condition data generated based upon the rolling resistance. In particular, the compaction coefficient generated using the measuring device, such as the ground penetration radar device, may be compared to or combined with the compaction coefficient generated based upon the rolling resistance. Therefore, the confidence in the compaction coefficient value may be determined and improved.

In the surface topography data generation step 64, actual and/or simulated surface topography data may be generated indicative of the surface topography of the terrain 13 along the route 12. The surface topography data may be generated by the external control system 40 or the machine control system 20. In particular, the surface topography data may comprise inclination data indicative of a gradient of the terrain 13 along the route 12. The inclination data may be expressed as a percentage, an angle or a ratio. The sensor(s) 21 may measure the inclination of the work machine(s) 11 on the terrain 13 relative to the direction of gravity in two or three dimensions (e.g. front to back and/or side-to-side inclination) to generate the inclination data. The inclination data may be indicative of a composite gradient of the terrain 13 along the route 12. For example, the inclination data may be expressed as a composite angle indicative of both side-to-side and front-to-back inclination of the work machine(s) 11 on the terrain 13. The surface topography or gradient of the terrain may be measured with reference to at least one reference location on the worksite 14 and the surface topography data may be generated in the form of point cloud data indicative of the actual two-dimensional or three-dimensional surface profile of the worksite 14. By way of example, the sensor(s) 21 may comprise a scanning device, which uses LIDAR to measure surface topography and generate surface topography data.

The generating surface topography data step 64 may comprise generating simulated surface topography data and/or retrieving previously generated simulated or actual surface topography data from a memory, such as the memory of the external control system 40 or the machine control system 20. The simulated surface topography data may be randomly generated, operator generated (e.g. explicitly specified by an operator) or may be based upon actual surface topography data from a historical worksite 14. The memory may store simulated surface topography data from a plurality of worksites 14.

The step of generating the surface topography data 64 may comprise extracting the inclination data from the surface topography data.

During the risk data generation step 65, the ground condition data and the surface topography data are processed to generate risk data indicative of a risk of instability of the work machine 11. Therefore, the risk data is based upon the ground condition data and the surface topography data. The risk data generation step 65 may optionally comprise processing temperature data indicative of an ambient temperature for the machine 11 or worksite 14. The temperature data may be received from the sensor(s) 21. Therefore, the risk data may be based upon the ground condition data, the surface topography data and the temperature data.

A high risk value may be generated if there is a high risk of instability. A low risk value may be generated if there is a low risk of instability. A medium risk value may be generated if the risk of instability is therebetween. By way of example, the risk of instability may be high if the grade of the terrain 13 is non-zero and the terrain 13 is too uncompact and soft such that instability of the work machine(s) 11 is likely. The risk of instability may also be high if the grade of the terrain 13 is non-zero and the rolling resistance of the terrain 13 is too high such that instability of the work machine(s) 11 is likely. The risk of instability may also be high if the grade of the terrain 13 would result in an unsafe level of side-to-side inclination or front-to-back inclination of the machine(s) 11. The risk of instability may also be high if sliding of the work machine(s) 11 is likely. Sliding of the work machine(s) 11 may be likely if, for example, the ambient temperature is below 0° C. such that the worksite 14 is icy and/or the rolling resistance of the terrain 13 is too low. By way of example, the risk of instability may be low if the machine(s) 11 is likely to be able to easily maintain its intended position and orientation on the worksite 14.

In a principle method of the disclosure, the risk data may comprise a risk value R indicative of the risk of instability for the work machine 11 moving along the route 12 along the terrain 13 of the worksite 14. The risk value R may be calculated based upon the compaction coefficient Cc and the inclination data B.

R may be calculated via the equation:

$$R = B \times (1 - Cc)$$

B may be the gradient of the terrain expressed as an angle of inclination.

Cc may be the compaction coefficient Cc. The compaction coefficient Cc may be generated by using a measuring device, such as the ground penetration radar device, as discussed above. Alternatively, the compaction coefficient Cc may be generated based upon the coefficient of rolling resistance where Cc=1/Crr as discussed above.

The higher the generated risk value R, the greater the risk of instability of the work machine 11. The generated risk value R may be compared to one or more predetermined risk thresholds to determine whether the risk value is a high risk value, a medium risk value or a low risk value. The predetermined risk thresholds may be generated experimentally or by performing simulations. The pre-determined risk thresholds may be stored on the memory of the external or machine control system 40, 20.

Exemplary rolling resistance data Crr and compaction coefficient data Cc for different types of surface are provided in table 1, below. This data is provided by way of example. In this example, as indicated by the heading of column A of the table, the rolling resistance data is that for a work machine 11 having radial tires.

TABLE 1

| Type of surface | A. Estimated ROLLING RESISTANCE For Radial Tires (Crr) | B. Compaction coefficient (1/Crr) |
|---|---|---|
| A very hard, smooth roadway, concrete. | 1.1 | 0.90 |
| A very hard, smooth roadway, concrete, cold asphalt or dirt surface. | 1.2 | 0.83 |
| A hard, smooth, stabilized surfaced roadway without tyre penetration under load, watered and maintained | 1.7 | 0.59 |
| A firm, smooth, rolling roadway with dirt or light surfacing, flexing slightly under load or undulating, maintained fairly regularly, watered | 2.5 | 0.40 |
| A dirt roadway, rutted or flexing under load, little maintenance, no water, 25 mm (1") tire penetration or flexing | 4 | 0.25 |
| A dirt roadway, rutted or flexing under load, little maintenance, no water, 50 mm (2") tire penetration or flexing | 5 | 0.20 |
| Rutted dirt roadway, soft under travel, no maintenance, no stabilization, 100 mm (4") tire penetration or flexing | 8 | 0.13 |
| Loose sand or gravel | 10 | 0.10 |
| Rutted dirt roadway, soft under travel, no maintenance, no stabilization, 200 mm (8") tire penetration and flexing | 14 | 0.07 |
| Very soft, muddy, rutted roadway, 300 mm (12") tire penetration, no flexing | 20 | 0.05 |

Exemplary calculations using the above equation together with the data from Table 1 are shown in Grid 1, illustrated in FIG. 7. The values for B are 2, 4, 6, 8, 10, 1214, 16, 18, 20 degrees as displayed on the horizontal, x-axis of the grid. The values for the compaction coefficient Cc are those from Table 1 and are displayed along the vertical, y-axis of the grid. As illustrated in the title of the grid, each square of the grid comprises a risk value R generated using the equation $R = B \times (1 - Cc)$. It is noted that, although the values for compaction coefficient (Cc) are rounded to the nearest second decimal place in Table 1 and Grid 1, the non-rounded values for compaction coefficient (Cc) are used in the equation to generate the risk value R.

Figure 8:
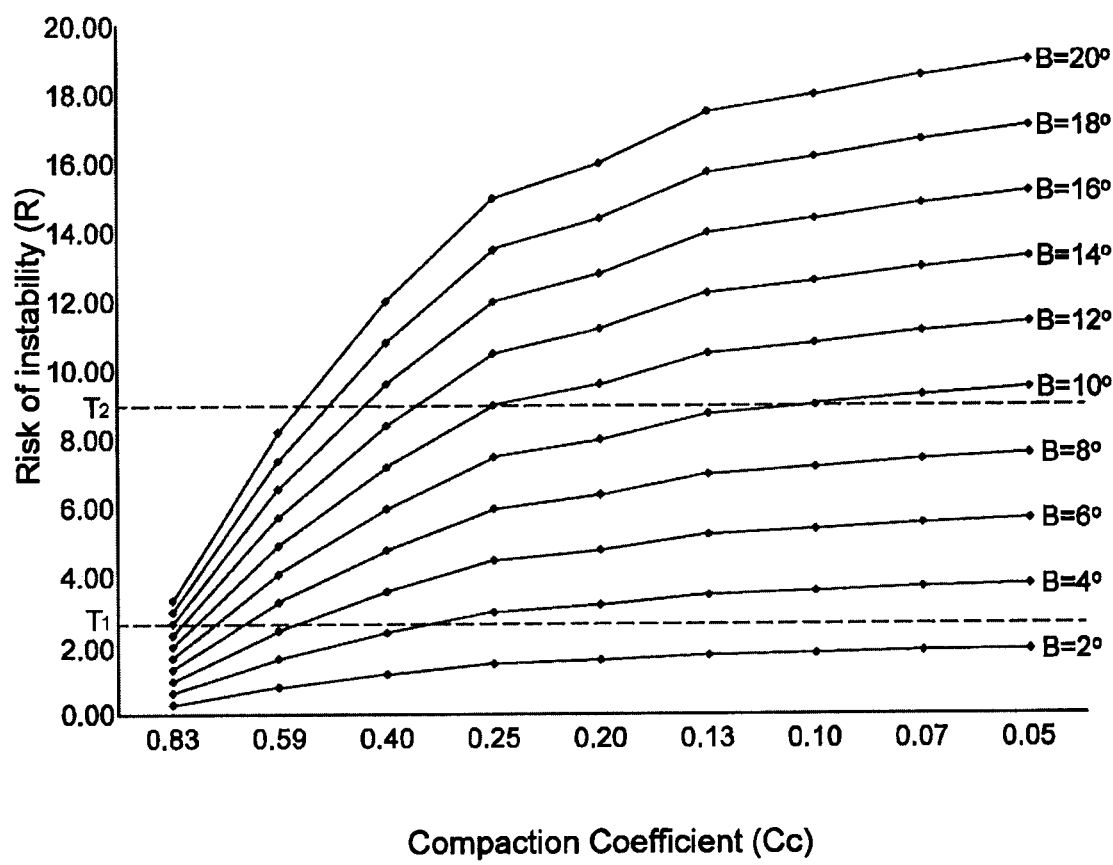
FIG. 8 is a graphical representation of the exemplary data of FIG. 7, generated in accordance with the present disclosure.

A graph displaying the risk data R shown in Grid 1 and generated using the above equation is provided in FIG. 8 (Graph 1). The x-axis of the graph is the compaction coefficient Cc and the y-axis of the graph is the risk data R. Each line of the graph represents different values for B. As shown in Graph 1, for a given inclination or gradient B, a higher rolling resistance Crr, and so lower compaction coefficient Cc, results in a higher risk of instability R. Graph 1 also illustrates that for a given compaction coefficient Cc, a greater inclination or gradient B results in a higher risk of instability R.

In Grid 1 and Graph 1, the inclination data B comprises inclination angles indicative of a side-to-side inclination of the machine 11 on the terrain 13 expressed as an angle of inclination in degrees. This is, of course, exemplary inclination data. The inclination data B may instead comprise an inclination angle indicative of both side-to-side and front-to-back inclination of the machine 11 on the terrain 13 (i.e. a composite inclination angle). In Graph 1, a first pre-determined risk threshold ($T_1$) has a risk value of 2.5 and a second pre-determined risk threshold ($T_2$) has a risk value of 9.0. Any risk values R between 0 and 2.5 are assigned as low risk values; any risk values R between 2.6 and 9.0 are assigned as medium risk values and any risk values between 9.1 and 20 are assigned as high risk values. The values for the predetermined risk thresholds are simply estimated values provided to aid understanding of this concept. Accurate pre-determined risk thresholds would need to be calculated experimentally or by performing simulations, as discussed above.

As discussed above, the step of generating risk data may further comprise comparing the temperature data to one or more predetermined temperature thresholds. Typically, the predetermined threshold may be zero degrees Celsius. If the temperature data is less than the predetermined temperature threshold, then the risk value may be assigned as a high risk value as there is a risk of slipping of the machine 11 due to icy terrain. For example, if the risk value R generated according to the above equation is below the first predetermined threshold (and so would normally be assigned as low risk) but the temperature is less than the predetermined temperature threshold, then the relevant area may be designated as high risk.

During the mapping step, map data may be generated by associating the ground condition data, the surface topography data and/or the risk data with the route data, such that the ground condition data, the surface topography data and/or the risk data is mapped to the route 12 and/or worksite 14. The external or machine control system 40, 20 may also associate the ground condition data, the surface topography data and/or risk data with the route 12 such that the ground condition data, the surface topography data and/or risk data may be associated with a certain position on the route 12. The ground condition data and/or risk data may be associated with the distance travelled along the route 12 (for example as a percentage of the total route 12 travelled). As a result a graph of ground condition, surface topography data and/or risk data can be plotted against the distance travelled. The ground condition data, surface topography data and/or risk data may be represented in a two or three dimensional map utilising the machine position data from the navigation unit. It will be appreciated that the ground condition data may only be representative of the ground condition under the ground engaging member(s) of the work machine(s) 11, but that the work machine(s) 11 may overlie a larger area of the terrain 13 than the ground engaging member(s). Therefore, each calculation of ground condition data, and so also each calculation of risk data, may be assigned as an average of the entire area of the terrain 13 under the work machine(s) 11 where the ground condition data is determined.

The ground condition and/or surface topography of the worksite 14 and/or risk of instability for a work machine(s) 11 travelling over the worksite 14 may be mapped to a blank map of the worksite 14. The ground condition, surface topography data and/or risk data may be illustrated via a two or three dimensional colour or gradient map. Furthermore, in the mapping step 66 the ground condition data, surface topography data and/or the risk data from a first route 12 may be incorporated into a map containing ground condition data, surface topography data and/or risk data from at least a second route 12, thereby forming a composite map. For example, if the system 10 comprises a plurality of work machines 11 travelling over a plurality of routes 12, ground condition data, surface topography data and/or risk data may be collected for each of the plurality of routes 12 and incorporated into the composite map. As a result, it may be possible to assemble a composite map of the ground condition and/or surface topography of the worksite 14 and/or risk of instability for a work machine 11 moving along a worksite 14 in an area larger than just a single route 12.

The ground condition data, the surface topography data and/or the risk data may be mapped to a blank map of the worksite 14. Typically, the risk data may be mapped to a blank, two or three dimensional map of the worksite 14. For example, an area designated as high risk may be coloured red on the map, whereas an area designated as medium risk may be coloured orange on the map and an area designated as low risk may be coloured green on the map.

During the communication step 67 the ground condition data, the risk data and/or the map data may be communicated to an operator, the external control system 40 and/or one or more further work machine(s) 11 via the external communication system 50. The data may be shown to an operator on the work machine(s) 11, one or more further work machine(s) 11 and/or an operator station within or external to the worksite 14. The data may be communicated between a plurality of work machines 11 in order to generate a composite map on one or more of the plurality of work machines 11. Furthermore, the data may be communicated to one or more compaction machine(s), as discussed in further detail below. Typically, map data comprising risk data mapped onto a two-dimensional map of the worksite 14 may be communicated to an operator, the external control system 40 and/or one or more further work machine(s) 11.

During the machine control step 68 the work machine(s) 11, which may be the work machine(s) 11 from which the ground condition data was obtained and/or one or more further work machine(s) 11 may be controlled based upon the ground condition data and/or the surface topography data and/or risk data and/or map data. The work machine(s) 11 may be manually controlled by an operator upon receiving an alert generated based upon the ground condition data, the topography data, the risk data and/or the map data. The work machine(s) 11 may also be automatically controlled (e.g. autonomously or semi-autonomously) by the machine control system 20 based upon the ground condition data, the surface topography data, the risk data and/or the map data. Typically, during the machine control step 68, the work machine(s) 11 may be controlled based upon the map data comprising risk data mapped to a two-dimensional map of the worksite 14.

The external or machine control system 40, 20 may be configured to process the map data comprising the risk data and alter a pre-determined route of the work machine(s) 11 such that the route avoids areas for having a high risk of instability. Alternatively, the external or machine control system 40, 20 may generate an alert to an operator if the work machine 11 approaches any locations having a high risk of instability. The external or machine control system 40, 20 may cause application of brakes of the work machine 11 if the work machine approaches any locations having a high risk of instability. Once the machine 11 has stopped following application of the brakes, the external or machine control system 40, 20 may control the machine 11 such that it may only move in the reverse direction towards a low risk area. Therefore, the area having a high risk of instability may be avoided. The external or machine control system 40, 20 may prevent an operator from overriding the control system 40, 20. Alternatively, the external or machine control system 40, 20 may enable an operator to override the control system 40, 20.

In the machine control step 68 the work tool(s) 15 may be controlled based upon the ground condition data, the surface topography data, the risk data and/or the map data. The external or machine control system 40, 20 may generate an alert for an operator if a work machine(s) 11 approaches an area is unsuitable for ejection of material from a work machine 11, such as a hauling machine, because the risk of instability is high. The pivoting speed, maximum angle and/or position of a work machine 11, such as a pivotable dump body, may also be controlled based upon the risk data. In particular, the pivoting speed and/or maximum angle may be reduced, or pivoting prevented entirely, when the work machine(s) 11 located in an area of the terrain 13 where the risk of instability is high. The positioning of an ejector body and/or speed of a conveyor may be similarly controlled. As a result, a hauling machine with a pivotable dump body may avoid pivoting the dump body in an area where rollover, tip-over or sliding of the work machine(s) 11 is likely.

It is possible to determine ground condition parameters of the work site, for example, the level of compaction of the terrain 13, using known laboratory and field tests. However, these tests may be cost and time expensive. The method 60 and system 10 may avoid the need to use such tests.

The ground condition data, route data, surface topography data, risk data and/or map data acquired from different surveying devices 30, work machines 11, compaction machines may be combined. Furthermore, the different operating characteristics of the compaction machine and the work machine 11 may provide that the combination of data from the two types of machine may produce a more accurate and/or more wide ranging ground condition and/or surface topography and/or risk of instability determination. For example, anomalies in ground condition readings from two different types of machine may produce information about ground condition and/or different modelling processes for the two types of machine may mean that more complete/accurate ground condition data may be obtained from two different types of machines.

The system 10 may comprise a plurality of surveying devices 30, which may be of different types and use different surveying methods. As discussed above, although the method 60 is described in relation to the control module of the work machine 11 and the external control system 40, it may equally be employed in the control system 31 of the surveying device(s) 30. Typically, when employed in the surveying device(s) 30, the ground condition data generating step 63 may comprise using a measuring device, such as a ground penetration radar device to measure compaction of the terrain 13 and generate the compaction coefficient data Cc. The ground penetration radar device may be configured to generate ground condition data by detecting compaction of the terrain 13 and voids, cracks and other subsurface objects within the terrain 13. Therefore, when the method 60 is employed in the surveying device 30, measurement of operating parameters and generation of rolling resistance is not required. The ground condition data obtained by the surveying device(s) 30 may be combined or compared with ground condition data generated by sensor(s) 21 on the work machine(s) 11. The surveying device 30 may employ a photogrammetric system or a LIDAR system to generate the surface topography data. In particular, at least one surveying device 30 may comprise a UAV comprising a photogrammetric system and at least one surveying device 30 may be a LIDAR system located on at least one work machine 11. The UAV may generate initial actual surface topography data which may be updated with actual surface topography data from the LIDAR system as the work machine 11 moves material and alters the surface topography of the terrain 13.

The method 60 and system 10 of the present disclosure may significantly improve the efficiency of operation of the work machine(s) 11 on the worksite 14. Work machines 11 may be operated to avoid areas for which the risk of instability is high, for example, areas of low compaction, or low rolling resistance thereby improving fuel efficiency and stability. An operator at a worksite 14 can identify ground condition parameters, for example compaction levels that may not be visually identifiable, which may particularly be the case in waste sites, by viewing the generated maps of compaction data and/or rolling resistance. Furthermore, the actual surface profile data obtained from the surveying device(s) 30 or the machine(s) 11 may be used to understand and predict the change in surface topography of the worksite 14.

The invention claimed is:

1. A method for predicting a risk of instability for one or more work machine(s) moving along a route along terrain of a worksite, the method comprising:
   obtaining ground condition data indicative of the ground condition of the terrain along the route, the ground condition data including rolling resistance data indicative of the resistance by the terrain to the movement of the one or more work machines along the route;
   obtaining surface topography data indicative of the surface topography of the terrain along the route;
   generating route data indicative of the route along the terrain; and
   processing the ground condition data, the surface topography data and the route data to generate risk data indicative of a risk of instability along the route.

2. The method of claim 1, wherein the method further comprises processing the risk data and the route data to generate a map of the risk of instability for a work machine along the route.

3. The method of claim 1, wherein the method further comprises processing the ground condition data and/or surface topography data and the route data to generate a map of the ground condition and/or surface topography for a work machine along the route.

4. The method of claim 1, further comprising operating the one or more work machine(s) along the route along the terrain.

5. The method of claim 1, further comprising comparing the risk data to a risk threshold value to determine whether the risk of instability along the route is high or low.

6. The method of claim 1, further comprising operating the work machine(s) based upon the risk data.

7. The method of claim 1, wherein the step of obtaining ground condition data comprises operating one or more sensor(s) located on the work machine to measure the ground condition of the terrain along the route.

8. The method of claim 1, wherein the step of obtaining ground condition data comprises operating one or more sensor(s) located on a surveying device.

9. The method of claim 1, further comprising:
   obtaining temperature data indicative of temperature of an atmosphere surrounding the work machine(s),
   wherein the step of generating risk data further comprises processing the temperature data such that the risk data is based upon the temperature data, the ground condition data and the surface topography data.

10. The method of claim 1, further comprising generating ground condition data and/or surface topography data and/or risk data from a plurality of work machines moving along a plurality of routes along the terrain and building a composite map indicative of the ground condition and/or surface topography and/or risk of instability along the plurality of routes.

11. The method of claim 10, wherein the step of obtaining ground condition data comprises:

generating operating parameter data indicative of one or more operating parameter(s) of the work machine(s) moving along the route; and processing the operating parameter data to generate the ground condition data.

12. The method of claim 11, wherein the step of generating the ground condition data further comprises:

processing the operating parameter data to generate the rolling resistance data.

13. The method of claim 12, wherein the ground condition data comprises compaction data indicative of the compaction of the terrain along the route, wherein the step of generating the ground condition data further comprises:

processing the rolling resistance data to generate the compaction data.

14. The method of claim 12, wherein the rolling resistance data is calculated based upon the driving force of the work machine(s) and accounting for loss during the movement of the work machine(s), wherein the loss comprises one or more of aerodynamic drag, inclination force and inertial force.

15. The method of claim 13, further including extracting inclination data from the surface topography data;

wherein the inclination data is indicative of a gradient of the terrain of the worksite along the route; and further wherein the step of generating the risk data comprises processing the compaction data and the inclination data to generate the risk data.

16. A system for determining the risk of instability for a work machine moving along a route along a terrain of a worksite, the system comprising:

a navigation unit configured to generate route data indicative of the route along the terrain;

one or more sensor(s) configured to generate ground condition data indicative of ground condition of the terrain of the worksite along the route, the ground condition data including rolling resistance data indicative of the resistance by the terrain to the movement of the one or more work machines along the route;

one or more sensor(s) configured to generate surface topography data indicative of surface topography of the terrain of the worksite along the route; and one or more processing unit(s) configured to process the ground condition data, the surface topography data and the route data to generate risk data indicative of a risk of instability along the route.

17. The system of claim 16 further comprising one or more work machine(s) configured to move along the terrain.

18. The system of claim 16, further comprising a control system configured to control operation of the work machine(s) based upon the risk data.

19. The method of claim 15, further comprising:

calculating a risk value based on the extracted inclination data and the rolling resistance data; and comparing the risk value to a first pre-determined risk threshold value and a second pre-determined risk threshold value, the first pre-determined risk threshold being smaller than the second pre-determined risk threshold.

20. The method of claim 19, further comprising:

categorizing the risk data as high risk when the risk value is above the second pre-determined risk threshold value, categorizing the risk data as low risk when the risk value is equal to or lesser than the first pre-determined risk threshold value, or categorizing the risk data as medium risk when the risk value is above the first pre-determined risk threshold value and equal to or below the second pre-determined risk threshold value.

* * * * *